UNITED STATES PATENT OFFICE.

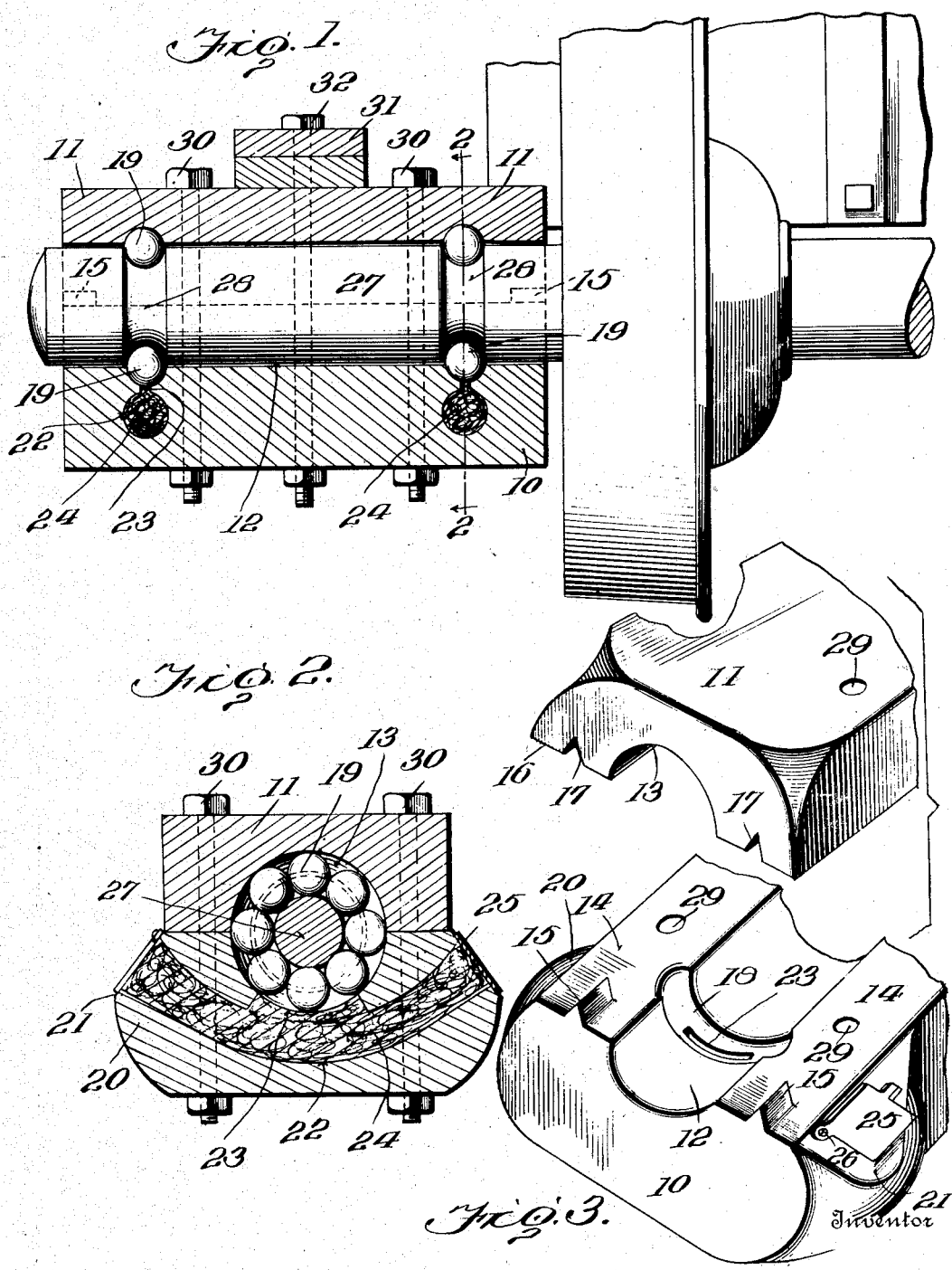

PETER V. HAUSMAN, OF EAST ALTON, ILLINOIS.

LUBRICATING JOURNAL-BOX.

1,174,497. Specification of Letters Patent. Patented Mar. 7, 1916.

Application filed March 9, 1915. Serial No. 13,191.

*To all whom it may concern:*

Be it known that I, PETER V. HAUSMAN, a citizen of the United States, residing at East Alton, in the county of Madison and State of Illinois, have invented certain new and useful Improvements in Lubricating Journal-Boxes, of which the following is a specification.

This invention contemplates an improved lubricating journal box especially designed for use in connection with railway rolling stock and has as its primary object to provide a device of this character wherein the friction between the journal and the bearing therefor, will be reduced to a minimum and wherein the said journal and its bearing will be maintained constantly lubricated.

The invention has as a further object to provide a journal box wherein the journal will be supported upon roller bearings adapted to engage the journal to prevent lateral shifting thereof relative to the journal box and wherein lubricant will be introduced directly to said bearings.

A further object of the invention is to provide a journal box, one portion of which is formed with lubricant receiving channels adapted to contain a quantity of lubricant, and wherein the said channels will be in communication with the roller bearings supporting the journal. And the invention has as a still further object to provide a journal box which will be simple in construction and which, while being especially designed for the purpose above set forth, will also be adapted for use in various other adaptations.

Other and incidental objects will appear as the description proceeds and in the drawings wherein I have illustrated the preferred embodiment of my invention and wherein similar reference characters designate corresponding parts throughout the several views, Figure 1 is a horizontal sectional view showing my improved journal box applied to a car axle, Fig. 2 is a transverse sectional view showing the arrangement of the lubricant receiving channels formed in one section of the box, Fig. 3 is a fragmentary perspective view showing the sections of the box detached from each other but in proper relative position, this view particularly illustrating the retaining lugs formed on one section of the box and adapted to engage within suitable notches formed in the other section thereof.

In the preferred embodiment of the invention as illustrated in the drawings, the body portion of my improved journal box is formed of mating sections 10 and 11. Medially formed in the section 10 upon one side thereof is a longitudinally extending channel 12 and formed in the section 11 is a similar channel 13, the said channels being adapted to mate in the assembled position of the sections to provide a cylindrical bore extending longitudinally through the journal box and opening through opposite ends thereof.

The section 10 is preferably provided with flat inner faces 14 and formed on the said section at the extremities thereof are upstanding laterally projecting lugs 15, one of said lugs being preferably arranged at opposite extremities of each of the faces 14. As best shown in Fig. 3 of the drawings, the lugs 15 are substantially triangular in cross-section. The section 11 is also preferably provided with flat inner faces 16 adapted to seat against the flat faces 14 of the section 10 and formed in the faces 16, at opposite extremities of the said section, are substantially V-shaped notches 17 adapted to receive the lugs 15 of the section 10. As will be seen, the lugs 15 are thus adapted to prevent any lateral shifting of the sections of the journal box relative to each other.

Formed in the channel 12 of the section 10, adjacent opposite extremities thereof, are arcuate grooves 18 adapted to mate with similar grooves formed in the section 11 in the assembled position of the said sections to provide a raceway for a plurality of bearing rollers 19, as shown in Fig. 2 of the drawings.

The section 10 adjacent opposite extremities thereof is laterally enlarged as shown at 20, which are provided with beveled faces 21. Formed in the said section and extending beneath the grooves 18 thereof in spaced relation to the said grooves are arcuate lubricant receiving channels 22, the extremities of which open through the enlargements 20. Formed in the bottom of the grooves 18 intermediate the ends thereof and communicating with the channels 22 are slots 23. The channels 22 are preferably filled with a fibrous packing or wick 24 and it will be observed that by introducing a lubricant within the said channels, the said lubricant will be communicated directly to the bearings 19, through the medium of the slots 23. Lubricant will, therefore, be constantly supplied to the said bearings, it being observed that the channels 22 are of such nature as to contain a considerable quantity of lubricant. Swingingly mounted upon the beveled faces 21 of the enlargements 20, are cap plates 25 adapted to close the channels 22 at their outer ends. The plates 25 may be of any desired character and are connected with the section 10 by pivot pins 26.

In Fig. 1 of the drawings, I have illustrated my improved journal box in connection with a car axle having a journal 27. Formed in the said journal at longitudinally spaced points, are annular grooves or channels 28 which receive the bearing rollers 19, it being observed that said bearings are adapted to support the sections 10 and 11 in spaced relation to the journals, so that the friction between the several parts will be reduced to a minimum. It is further to be observed that the bearing rollers 19 are adapted to engage within the channels 28 to prevent any shifting of the journal longitudinally within the journal box.

Formed in the side margins of the sections 10 and 11 and at longitudinally spaced points, are a plurality of alined openings 29 which removably receive bolts or other suitable fastening devices 30 for detachably connecting the said sections together, and, as shown in Fig. 1 of the drawings, the journal box is preferably connected with the supporting members of the car conventionally shown at 31, by a plurality of bolts 32. It will thus be seen that I provide a very simple and efficient construction for the purpose set forth and which, while being especially designed for use in connection with railway rolling stock, may also be adapted for use in various other connections. Thus for very heavy work, the box may be formed with a plurality of raceways each adapted to receive a series of bearing rollers so that weight upon the journal will be distributed over a correspondingly increased area, this modification in structure being entirely within the purview of the invention.

Having thus described my invention, what I claim and desire to secure by Letters Patent is:—

1. A journal box including a fixed body portion formed of mating sections and provided with mating channels forming a bore extending longitudinally of the body, mating grooves formed in said sections and providing raceways, one of said sections being provided with lubricant receiving channels opening upon opposite sides thereof and being formed with slots establishing communication between said lubricant receiving channels and said raceways, and bearing rollers disposed in said raceways, the said bore being adapted to freely receive a journal having spaced annular channels formed therein adapted to operatively receive said bearing rollers.

2. A journal box including a body portion formed of mating sections detachably connected, said sections having mating channels formed therein providing a bore extending longitudinally of the body portion, one of said sections being laterally enlarged adjacent opposite extremities thereof and having arcuate lubricant receiving channels formed therein opening through said enlargements upon opposite sides of the said section, said sections being provided with raceways, the first mentioned section having slots formed therein establishing communication between said lubricant receiving channels and said raceways, and bearing rollers disposed in said raceways, the said bore being adapted to freely receive a journal having spaced annular channels formed therein adapted to operatively receive said bearing rollers.

3. A journal box including a body portion formed of mating sections detachably connected together and provided with mating channels forming a bore extending longitudinally of the body portion and opening through opposite ends thereof, one of said sections being provided at its extremities, with notches, lugs formed on the other of said sections and engaging in said notches whereby to prevent relative lateral shifting of the sections, said sections having longitudinally spaced annular raceways formed therein opening into said bore, said last mentioned section being laterally enlarged adjacent opposite extremities thereof and having arcuate lubricant receiving channels formed therein opening upon opposite sides of the said section and through said enlargements, there being slots formed in the said last mentioned section establishing communication between said raceways and said lubricant receiving channels, cap plates swingingly mounted upon said enlargements and closing the lubricant receiving channels at their outer ends, and bearing rollers freely mounted in said raceways, the said bore being adapted to receive a journal having spaced annular channels formed therein adapted to freely receive said bearing rollers.

4. A journal box including a body portion bored to receive a journal, there being raceways formed in the body portion adapted to receive journal supporting bearing rollers, the body portion being provided with lubricant receiving chambers opening through opposite sides thereof and formed with slots establishing communication between said chambers and the raceways.

In testimony whereof I affix my signature in presence of two witnesses.

PETER V. HAUSMAN. [L. S.]

Witnesses:
 GEO. M. LEVIS,
 WM. FRITZ.